United States Patent [19]

Neukermans

[11] Patent Number: 4,468,282

[45] Date of Patent: Aug. 28, 1984

[54] METHOD OF MAKING AN ELECTRON BEAM WINDOW

[75] Inventor: Armand P. Neukermans, Palo Alto, Calif.

[73] Assignee: Hewlett-Packard Company, Palo Alto, Calif.

[21] Appl. No.: 443,709

[22] Filed: Nov. 22, 1982

[51] Int. Cl.[3] ........................ B44C 1/22; C03C 15/00; C03C 25/06

[52] U.S. Cl. ................................... 156/633; 156/644; 156/655; 156/657; 156/659.1

[58] Field of Search ............... 156/629, 633, 634, 643, 156/644, 646, 655, 657, 659.1, 662; 430/5, 23, 323; 428/134, 135, 136, 138; 250/511; 346/158, 161, 76 PH

[56] References Cited

U.S. PATENT DOCUMENTS 3,607,680 9/1971 Uno et al. ........................ 156/644 X
3,742,230 6/1973 Spears et al. ........................ 430/5 X
3,971,860 7/1976 Broers et al. ........................ 430/5 X

*Primary Examiner*—William A. Powell

*Attorney, Agent, or Firm*—Joseph H. Smith; John A. Frazzini

[57] ABSTRACT

A method of making an electron permeable window is provided which entails depositing a thin film of an inert, high strength material or compound having a low atomic number onto a substrate by chemical vapor deposition (CVD). Following that deposition, a window pattern and window support perimeter are photolithographically defined and the substrate is etched to leave the desired window structure. For a particular class of materials including SiC, BN, $B_4C$, $Si_3N_4$, and $Al_4C_3$, films are provided which are exceedingly tough and pinhole free, and which exhibit nearly zero internal stress. Furthermore, due to their extreme strength, these materials allow fabrication of extremely thin windows. In addition, because of their low atomic number and density, they have excellent electron penetration characteristics at low beam voltages (15 to 30 kV), so that most conventional CRT deflection schemes can be used to direct the beam. Also, such films are remarkably resilient and chemically inert even when very thin and can easily withstand large pressure differences.

8 Claims, 18 Drawing Figures

(WINDOW ASSEMBLY 15)

METHOD OF MAKING AN ELECTRON BEAM WINDOW

BACKGROUND OF THE INVENTION

This invention relates to a new and improved electron window which can be made very thin and yet withstand high pressures and temperatures. Due to these characteristics, the window is especially useful in electron beam addressed printing devices generally, and particularly appropriate for use in a thermal ink jet printer which uses an electron beam as the source of thermal energy.

Electron Windows

When energetic electrons impinge on a substance, they penetrate to a depth which is dependent upon their energy and the physical properties of the specific substance. When such a substance is formed as a thin film, i.e., thin compared with the electron penetration depth, electrons will completely penetrate the film and continue at a somewhat reduced energy. Hence, such a film can be used as a window in a cathode ray tube (CRT) for permitting the ejection of free electrons from the vacuum environment of the tube into another environment, e.g., the ambient atmosphere, or into a liquid such as ink. Unfortunately, in many desired applications, a major constraint on the window is that it be able to withstand large pressure differences from one side to the other, while at the same time not causing significant scattering of the beam. Such a constraint is very restrictive. It generally means that the window must be quite small and quite thin, small in order to be adquately supported to withstand significant pressure differences and thin to avoid beam scattering. Several examples of such structures can be found in the following patents: R. E. Hester, et al., U.S. Pat. No. 3,211,937 entitled CARBON-COATED ELECTRON-TRANSMISSION WINDOW, issued Apr. 20, 1962, and assigned to the United States of America; John A. von Raalte, et al., U.S. Pat. No. 3,788,892, entitled METHOD OF PRODUCING A WINDOW DEVICE, issued Jan. 29, 1974, and assigned to RCA Corporation; Yoshihiro Uno, et al., U.S. Pat. No. 3,611,418, entitled ELECTROSTATIC RECORDINGDEVICE, issued Sept. 30, 1968, and assigned to Matsushita Electric Industrial Company, Ltd.

Hester discloses a carbon coated foil window which can withstand high pressure differences but its use is limited to high energy situations, i.e., electron energies on the order of 5 MeV to avoid significant absorption or scattering. Von Raalte discloses a method of making a compound window, i.e., a window array made up of a number of smaller windows, each being quite thin and small, thereby achieving adequate supporting structure to withstand large pressure differences. However, the Von Raalte window is unsuitable for many applications because of the intervening supporting structures between individual windows. Similarly, the Uno window, in order to withstand large pressure differences while being large in size, must be backed up by a suitable supporting member having a series of slits or perforations, or a mesh-like form. Again these intervening supporting structures tend to interfere with numerous applications.

Another type of window is discussed in U.S. Pat. No. 3,815,094 entitled ELECTRON BEAM TYPE COMPUTER OUTPUT ON MICROFILM PRINTER, issued June 4, 1974 to Donald O. Smith, and assigned to Micro-Bit Corporation. This window has the advantage of being long and narrow without intervening supporting structures. It is generally fabricated by growing a thin film by chemical reaction with the bulk supporting member, and then differrentially etching the bulk supporting member to leave the window portion, that portion of the bulk supporting member which is retained forming a sturdy mounting or frame for the window. In the art, forming such a film by chemical reaction with the bulk supporting member usually means that the thin film is formed by pyrolytic decomposition of a reactant gas (e.g., $H_2O$) into its component species, followed by reaction of these active species with whatever is nearby (e.g., a Si substrate) to grow a film of new material (e.g., $SiO_2$) on top of the substrate.

Such a process for forming a thin film has a number of inherent disadvantages. The thickness of the window formed in this way is extremely limited because of one of the reactants must diffuse through the newly formed layer. The thicker the window the longer it takes to grow, the time varying approximately exponentially with film thickness. Furthermore, in such a process, the internal stress in the film cannot be controlled independently of the thickness, so that the thicker the film, the higher the stress. For example, it is not clear that a film of $SiO_2$ such as that disclosed by Smith could be made with a thickness much in excess of 1 micron by this process, because the magnitude of the internal stress would be very high, perhaps high enough to crack the film. Moreover, it is generally recognized that the strength of $SiO_2$ in compression is quite high while its strength in tension is near zero. Hence, an $SiO_2$ film having a thickness of 1 micron or less has insufficient strength to withstand the pressure differences encountered between the interior of a CRT and the ambient atmosphere, let alone the large pressure differences associated with the vapor explosions which occur in a thermal ink jet printer. This fragility is consistent with the patent to Smith which only discloses operating with a vacuum on both sides of the electron window, rather than between a vacuum and atmospheric pressure and discloses making $SiO_2$ windows with thicknesses only on the order of 1 micron or less. Furthermore, such films often suffer from pinholes, making their use impractical for a sealed system. In addition, other materials mentioned in Smith, cannot be practically grown by pyrolytic decomposition and substrate reaction alone.

Thermal Ink Jet Printing

The prior art with regard to thermal ink jet printing is adequately represented by the following U.S. Pat. Nos.: 4,243,994; 4,296,421; 4,251,824; 4,313,124; 4,325,735; 4,330,787; 4,334,234; 4,335,389; 4,336,548; 4,338,611; 4,339,762; and 4,345,262. The basic concept there disclosed is a device having an ink-containing capillary with an orifice for ejecting ink, and an ink heating mechanism, generally a resistor, in close proximity to the orifice. In operation, the ink heating mechanism is quickly heated, transferring a significant amount of energy to the ink, thereby vaporizing a small portion of the ink and producing a bubble in the capillary. This in turn creates a pressure wave which propels an ink droplet or droplets from the orifice onto a nearby writing surface. By controlling the energy transfer to the ink, the bubble quickly collapses before it can escape from the orifice. Also, as disclosed in application Ser.

No. 292,841, filed Aug. 14, 1981, entitled THERMAL INK JET PRINTER, by Vaught, et al., now abandoned. This bubble collapse can cause quick destruction of the resistor through cavitation damage if appropriate precautions are not taken. Typically, these precautions include coating the resistor with a protective layer, carefully controlling the bubble collapse, or mounting the resistor on an unsupported portion of a strong thin film which will permit flexure, the film being between the resistor and the ink.

None of the above references, however, consider the use of an electron beam as the primary heating source in driving a thermal ink jet printer, nor does the art disclose an appropriate electron beam window which can be used to achieve such a device nor the particular methods and materials required.

SUMMARY OF THE INVENTION

In accordance with the preferred embodiments of the invention, a new type of electron window is provided which is extremely useful in high temperature, high pressure environments. According to a preferred embodiment of the invention, a method of making the electron window is to deposit a thin film of an inert, high strength material or compound having a low atomic number onto a substrate by chemical vapor deposition (CVD). Following that deposition, a window pattern and window support perimeter are photolithographically defined and the substrate is etched to leave the desired window structure.

The importance of this method of window construction lies in the fact that the films formed by CVD can be carefully controlled as to their stoichiometry and as to their internal stress (both sign and magnitude) during the deposition process. Moreover, since the substrate provides only physical support and does not participate in the chemical reaction, the choice of compound is not restricted by the substrate material. Hence, thin films of compounds such as SiC, BN, $B_4C$, $Si_3N_4$, and $Al_4C_3$ can be formed on a variety of substrates to provide films which are exceedingly tough and pinhole free, and which exhibit nearly zero internal stress. Furthermore, due to their extreme strength, these materials allow fabrication of extremely thin windows. In addition, because of their low atomic number and density, they have excellent electron penetration characteristics at low beam voltages (15 to 30kV), so that most conventional CRT deflection schemes can be used to direct the beam. Also, such films are remarkably resilient and chemically inert even when very thin and can easily withstand the pressure differences and the peak pressures encountered in a thermal ink jet print head.

In accordance with the preferred embodiments of the electron window, a new type of thermal ink jet print head is provided which is driven by an electron beam. The print head is constructed of an electron permeable thin film (electron window) which in one embodiment, has on one of its surfaces a plurality of electron absorbing (heater) pads that are in thermal contact with an ink reservoir. As electrons from a CRT traverse the thin film and are absorbed by a pad, they introduce an extremely large and rapid temperature increase in the pad. As a result, a sufficient amount of thermal energy is absorbed by the ink to cause a vapor explosion within the ink, thereby ejecting ink droplets from a nearby orifice in the ink reservoir. In another embodiment, the electrons traverse the window and are absorbed in the ink rather than in pads, and in another embodiment the electrons are absorbed directly in the window itself.

DETAILED DESCRIPTION OF THE INVENTION

Figure 1A:
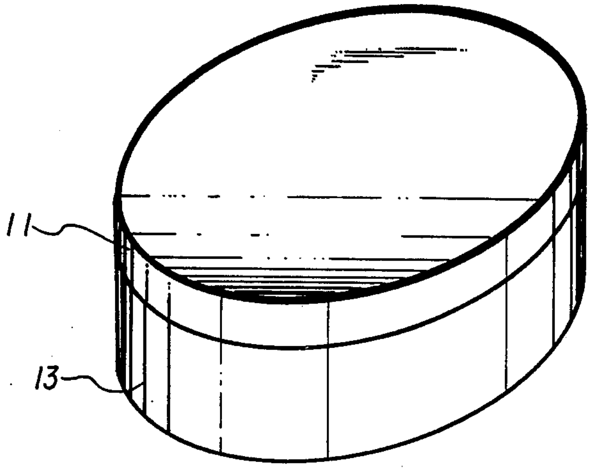
FIGS. 1A through 1F depict the sequence of steps involved in producing one embodiment of the invention, as well as illustrating its specific geometric configuration.
Figure 1B:
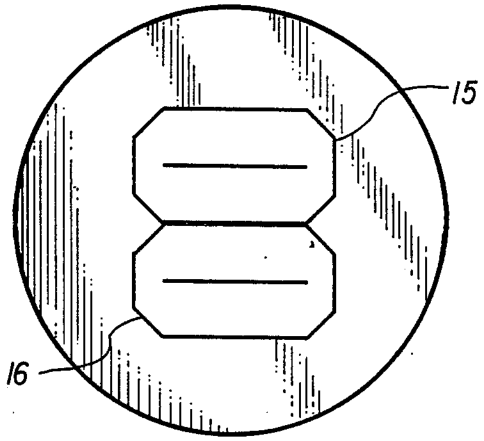
Figure 1C:
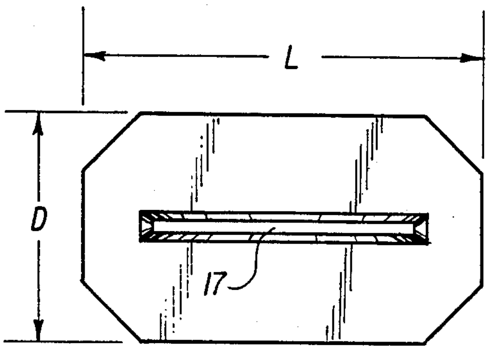
Figure 1D:
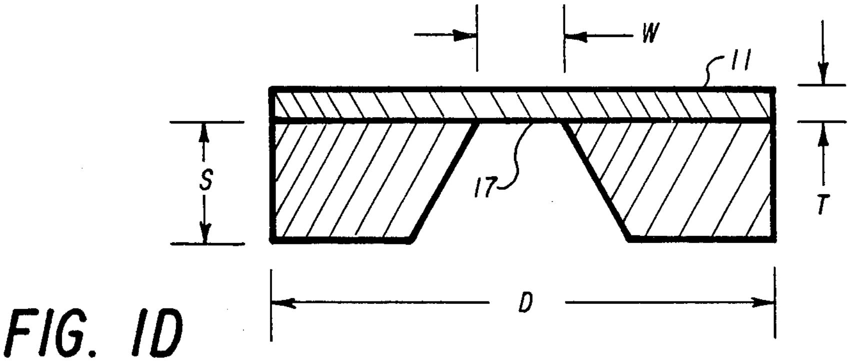
Figure 1E:
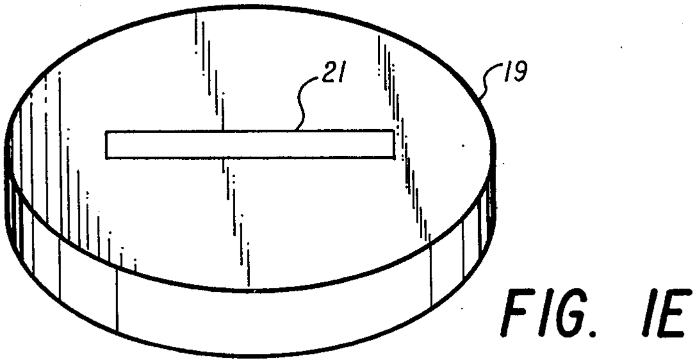

FIGS. 1A through 1F depict one embodiment of a method of constructing a long thin electron beam window. In this embodiment the process is begun by depositing a film 11, which is to comprise the electron beam window, onto a substrate 13 which is a clean Si wafer having a <100>orientation, the deposition being accomplished by CVD. (For examples of standard CVD techniques see W. M. Feist, S. R. Steele, and D. W. Ready, "The Preparation of Films by Chemical Vapor Deposition, Physics of Thin Films," Vol. 5, edited by G. Hass and R. E. Thun, ppg. 237–314, Academic Press, 1969; J. J. Tietijen, "Chemical Vapor Deposition of Electronic Materials", A. Rev. Mater. Sci. 3, 317–326, edited by R. A. Huggins; R. H. Sube and W. Roberts, published by Annual Reviews, 1973; and T. L. Chu and R. K. Smelzer, "Recent Advances in Chemical Vapor Growth of Electronic Materials", J. Vac. Sci. Technol. 10, 1, 1973.) Typical materials for film 11 include SiC, BN, $Si_3N_4$, $Al_4C_3$, or $B_4C$, while typical thicknesses T for film 11 range from about 0.5 micron up to about 5 microns, with a preferred range of about 1 micron up to about 2 microns. Stress in film 11 is usually maintained below about $2\times10^9$ dynes/cm$^2$. Following deposition, film 11 is typically masked to define a window pattern and a window support perimeter and the assembly is anisotropically etched, usually with KOH, hydrazine, or ethylene diamine pyrocathecol. (These etchants allow precise dimensional control with <100> silicon.) The mask is then stripped leaving the window assemblies 15 and 16 is illustrated in FIG. 1B. FIG. 1C provides a more detailed picture of window assembly 15 showing a long narrow window 17 approximately in the middle of the assembly where substrate 13 has been etched away. Typical window assembly dimension L ranges from about 1 inch to about 3 inches with a width D typically on the order of 0.375 inches. FIG. 1D shows a cross-sectional view of window assembly 15, illustrating the relationship among the various elements of the window assembly. Typical window widths W range from 0 in. to 0.100 in., with a preferred width of about 0.015 in. A typical thickness S for silicon substrate 13 is on the order of 0.020 in.

Figure 1F:
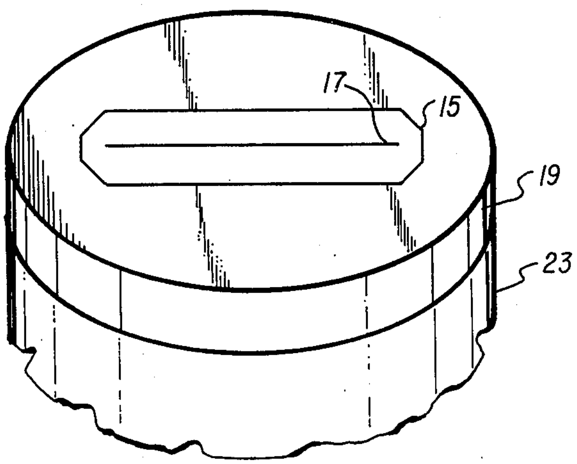

To accept the window assembly, a CRT faceplate 19 is prepared, typically of pyrex 7740 plate glass, in order to match the thermal expansion coefficient of the Si. A slot 21 (see FIG. 1E) having a width on the order of 0.125 in. is cut into faceplate 19, and the face plate is polished flat to within 10 microns or more preferably to within 3 microns. Window 17 of window assembly 15 is then carefully aligned with slot 21 of faceplate 19, and field assisted bonding (i.e., anodic bonding) is then used to bond the window assembly to the faceplate (FIG. 1F). Although other types of bonding such as high temperature epoxy could be used, field assisted bonding is especially useful in this situation since it is chemically clean and avoids introducing anything into the CRT which could poison the cathode, thus permitting production of the device as a sealed system. Following the bonding of the window assembly and faceplate, faceplate 19 is joined to an electron gun/funnel assembly 23 and the system is pumped out and sealed according to customary procedures.

Although an electron beam window formed in the above manner is useful for many applications, the limited size of the window is a major constraint, due to the available wafer sizes. To make larger windows using crystalline substrates would, of course, require larger silicon wafers or other crystalline materials in larger sizes, either or both of which can be absurdly expensive or altogether unobtainable. For a practical printer, however, a window size of 8-½in. would be required, and 14 in. and larger would be very useful.

Although convenient, it is not necessary to use single crystal silicon as the substrate for growing the above films. CVD can also be used to grow films independently of substrate composition. This lends great flexibility in choosing the optimum combination of substrate and window materials, and permits manufacture of much longer electron windows.

In this regard, polycrystalline substrate materials appear to be particularly useful, as long as they are chosen appropriately, i.e., provided that their thermal expansion coefficient closely matches that of the window film, they can withstand the deposition temperatures (up to about 1200 degrees centigrade), they are amenable to further processing such as etching, they can be bonded easily to tube components, and they are sufficiently rigid for handling ease. Some examples of such materials are tungsten, molybdenum, and polysilicon.

The specifics of the CVD process used for making long windows varies somewhat depending on the desired window material. For example, for a SiC window with the deposition process implemented as APCVD (atmospheric pressure CVD), representative parameters are as follows: typical temperatures in the reaction tube range from about 800 degrees C. to about 1200 degrees C.; flow rates are usually in the range of 50-100 liters/min. for hydrogen ($H_2$) carrier, 4-20 liters/min. for $CH_4$ reactant, and 50- 300 cc/min. 300 cc/min. for $SiCl_2H_2$ (or $SiCl_4$) reactant. For film thicknesses in the range of 0.1 to 5 microns, typical deposition times are less than 45 minutes for most films. For other kinds of films, for example, BN or $B_4C$, LPCVD (i.e., low pressure CVD) is used. For deposition of BN in particular, representative parameters are as follows: typical reaction tube temperatures range from 250 degrees C. to 1000 degrees C., with flow rates usually in the range of 100-600 scc/min. (i.e., standard cc/min.), 0.05-0.10 for the ratio $B_2H_6/H_2$, and 0.25-5 for the ratio $B_2H_6/NH_3$.

Figure 2A:
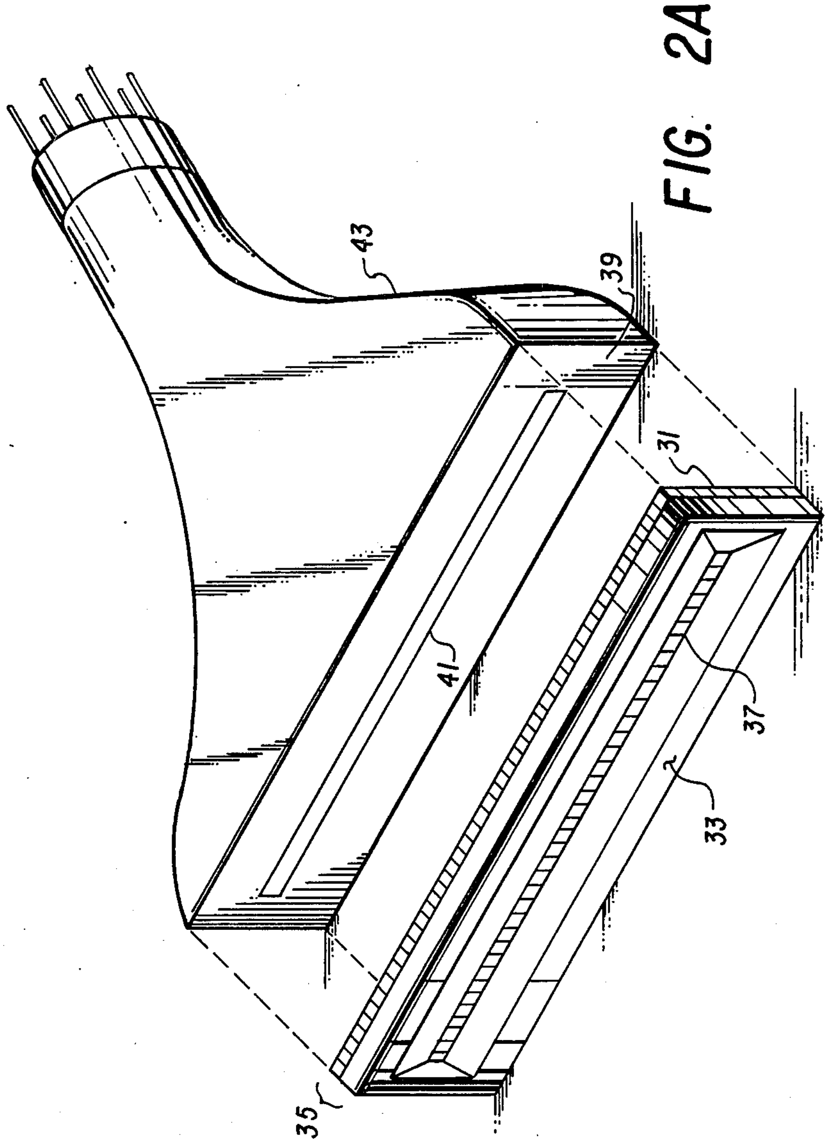
FIGS. 2A and 2B show another embodiment of the invention depicting a long narrow electron window structure.
Figure 2B:
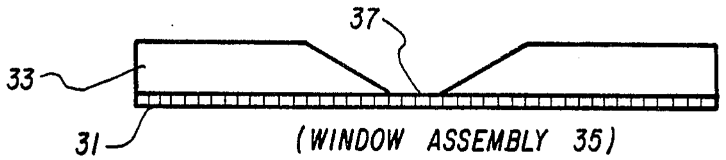

Following deposition of the thin film on a substrate, the process of forming a window is similar to that previously described for a crystalline substrate. FIG. 2 shows an embodiment of a typical long narrow window assembly 35 formed using a polycrystalline substrate 33. First, a portion of substrate 33 is etched away, e.g., by wet chemical, plasma, reactive ion, or other methods leaving a narrow portion of film 31 to define a window 37. The window structure 35 can then be bonded to face 39 of a CRT structure 43 by suitable clean techniques, of course being careful to align window 37 with slot 41 in the CRT.

Depending on which face of the window structure 35 is placed next to face 39 of the CRT, the bonding techniques can vary somewhat. For example, if film 31 is to be located next to the CRT, with substrate 33 to the outside as shown in 2A, the window structure can be anodically bonded to the face, using an additional aluminum layer to enhance bonding if necessary. On the other hand, if the polysilicon substrate 33 is to be placed next to face 39 with film 31 to the outside, not only can anodic bonding be used, but a clean soldering technique may be used as well. There, typically an adhesion layer of titanium is evaporated onto substrate 33 followed by a layer of gold, after which the substrate is soldered to be faceplate. Similarly, a substrate of a different material may require slightly different bonding techniques. For example, for molybdenum or tungsten substrates, it is typical to evaporate an adhesion layer of nickel followed by a layer of copper before soldering the substrate to the CRT faceplate.

A similar embodiment is to deposit a suitable film (e.g., SiC) onto a polycrystalline substrate to make a sandwich structure as described above. Then, the sandwich structure is bonded to a CRT faceplate by the techniques described above with the film next to the faceplate, the CRT faceplate having a narrow slit such as slit 41 in FIG. 2A. Following that bonding, the polycrystalline substrate can be completely etched away, leaving only the thin film bonded to the CRT faceplate. This provides an electron window in the CRT faceplate and relieves the requirement for precision etching of the slot in the window support substrate, a process which is more difficult to accomplish.

All of the above embodiments can be used to write on paper or other recording media directly, either in the ambient atmosphere or in a controlled vacuum environment to avoid ionization effects in the air. However, another particularly important use of an electron window formed by CVD is in the area of electron beam driven thermal ink jet printers.

Figure 3B:
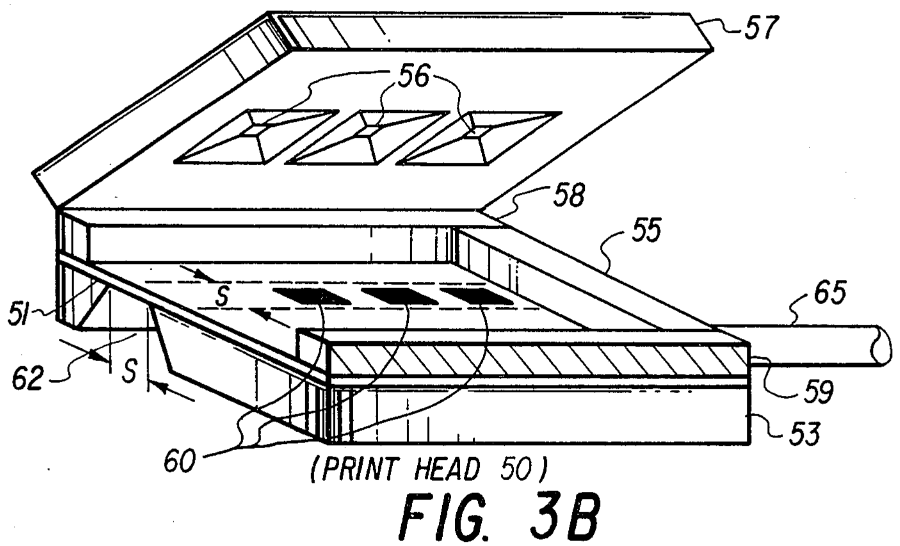
FIGS. 3A through 3C illustrate an embodiment of a thermal ink jet print head according to the invention showing specific details of its construction
Figure 3C:
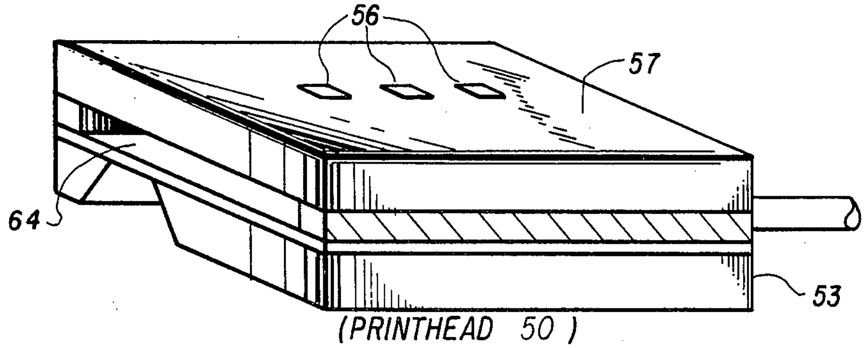
Figure 3A:
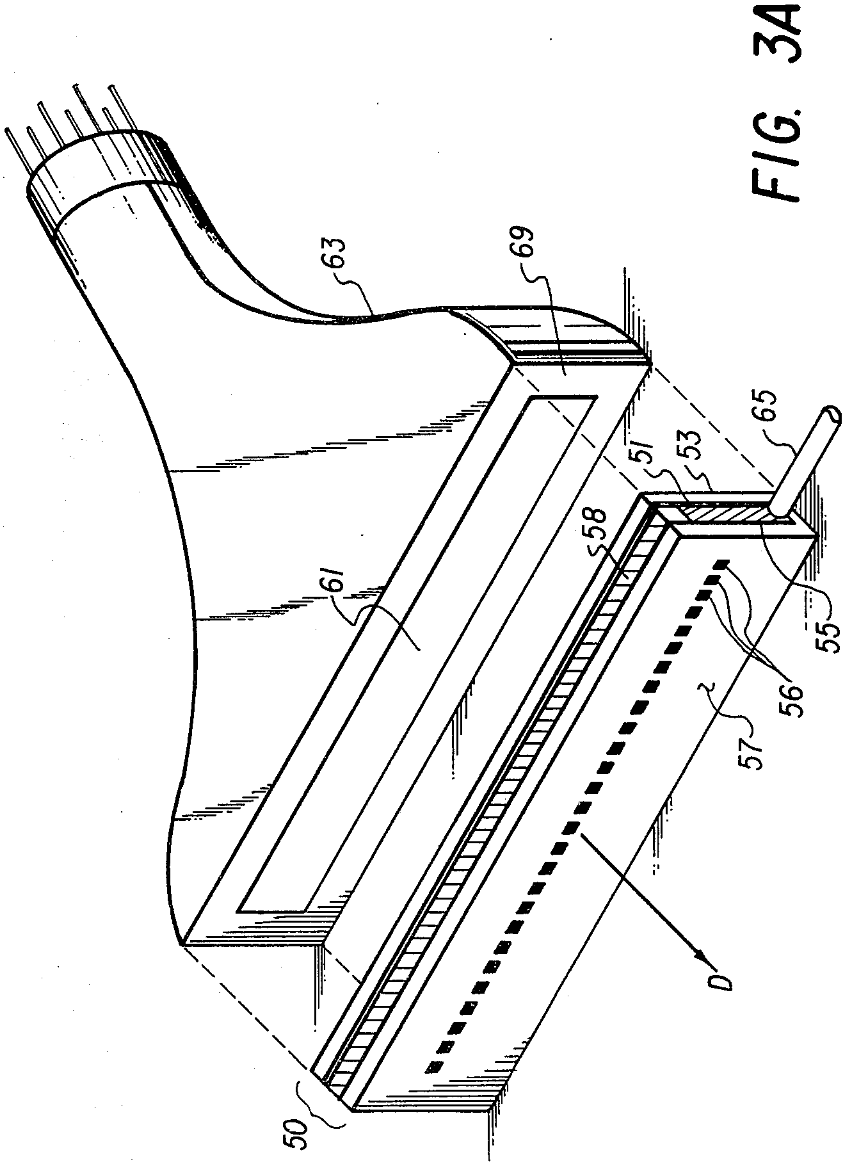

Such an embodiment of a device according to the invention is shown in FIGS. 3A, 3B, and 3C. In this embodiment, a thermal ink jet print head 50 is attached to a faceplate 69 of a CRT 63, by methods similar to those described earlier when fastening an electron window assembly to a CRT faceplate. Print head 50, however, has a significantly different construction from that of prior art thermal ink jet devices. The concept of the construction of print head 50 centers around the use of the electron beam to supply the thermal energy required to activate the ink jet head. First a long narrow window assembly is constructed much as previously described. In this embodiment, the window assembly is made by using CVD to deposit a thin film 51 of window material onto a substrate 53. A portion of substrate 53 is etched away leaving a long narrow channel 62 (which closely resembles the channel shown in FIG. 2A which there exposed thin film window 37).

Shown in FIGS. 3B and 3C is a cross-section of one end of print head 50 illustrating details of its internal construction. The head is made up of an orifice plate 57 and spacers 55, 58, and 59 configured in a manner to create an ink reservoir 64. The window assembly is made up of substrate 53 and thin film 51, with thin film 51 located on the side of the reservoir which is next to the CRT faceplate. Located on thin film 51 immediately opposite channel 62 are a plurality of heater pads 60 which are thin film metalizations for absorbing electrons from the electron beam. Orifice plate 57 has a plurality of orifices 56 which are located substantially opposite an equal number of heater pads. These heater pads are located on thin film 51 immediately opposite channel 62 and are typically made up of a thin layer of conductor. Thus, the heater pads readily absorb electrons incident from the beam, thereby providing the thermal energy needed to drive the thermal ink jet.

The specific composition of materials, and the specific dimensions of the various components making up the ink jet head varies considerably depending on the desired application. For an operable device, the basic physical constraints in this particular embodiment are that the electron window formed by channel 62 and thin film 51 be thin enough to transmit enough electrons at a particular CRT voltage onto each heater pad to create bubbles of sufficient size to eject droplets of ink, while at the same time the window must be sufficiently strong to withstand the pressures created by the expanding and collapsing bubbles. In addition, the typical dimensions and materials used in resistor driven thermal ink jet systems are substantially the same as those in the electron beam driven ink jet head in order to meet the physical requirements for production of high quality printing. Generally, the substrate 53 and thin film 51 combination for making the electron window portion can be constructed of the same materials and in the same manner as described earlier in regard to FIGS. 1 and 2. Also, the thickness for substrate 53 is not critical and can vary over a wide range. Usually no upper limit on its thickness is required other than what can reasonably be made. At to a lower limit, that is determined by ease of handling during window construction and by physical parameters pertaining to the supports required to back up the electron window assembly. Typical thicknesses for a polysilicon substrate 53 range from about 250 microns upward when used with a SiC thin film 51. The thickness of thin film varies depending on electron beam energy. For example, for a 30KeV beam, the thickness of thin film 51 is typically in the range of 1 to 5 microns when the window has a narrow dimension S on the order of 2 to 5 mils. Heater pads 60 are usually constructed by customary electronic fabrication techniques such as physical or chemical vapor deposition. Standard materials for heater pads 60 are good conductors, such as chrome/gold or aluminum, which are generally formed into square pads ranging from about 3 mils×3 mils to 5 mils×5 mils and approximately 0.25 to 5 microns thick.

Spacers 55, 58, and 59 maintain a separation between thin film 51 and orifice plate 57, thereby providing a capillary channel 64 for ink to flow from an inlet pipe 65 throughout the head and to the vicinity of the heater pads. Spacers 55, 58, and 59 typically provide a separation of approximately 1.5 to 3 mils, and can be constructed of most any inert material which can be readily formed or shaped on the surface of the thin film 51. Good examples are plastic, glass, or Riston (registered trademark of Dupont), since it is photoetchable. Orifice plate 57 can also be constructed of a wide variety of materials. For smaller ink jet heads, a silicon wafer approximately 20 mils thick of <100> orientation is particularly convenient since very precise orifices 56 can be easily etched into the structure. (See U.S. Pat. No. 4,007,464 issued Feb. 8, 1977, entitled "INK JET NOZZLE, " by Bassous, et al.). For larger heads other materials are more practical, for example, a piece of metal or even plastic with a thickness at the orifice in the range of 0.5 to 5 mils. Orifice sizes too can vary significantly depending on the desired drop size. However, for typical beam currents on the order of 100 μA with electron beam exposure times of approximately 17.5 μA (i.e., approximately 50 microjoules/ejected droplet), orifices of about 4 to 16 square mils have acceptable performance, with the preferred size being about 9 square mils. It should be apparent, however, that the beam current could be increased substantially while shortening exposure times to achieve higher speed.

Figure 4A:
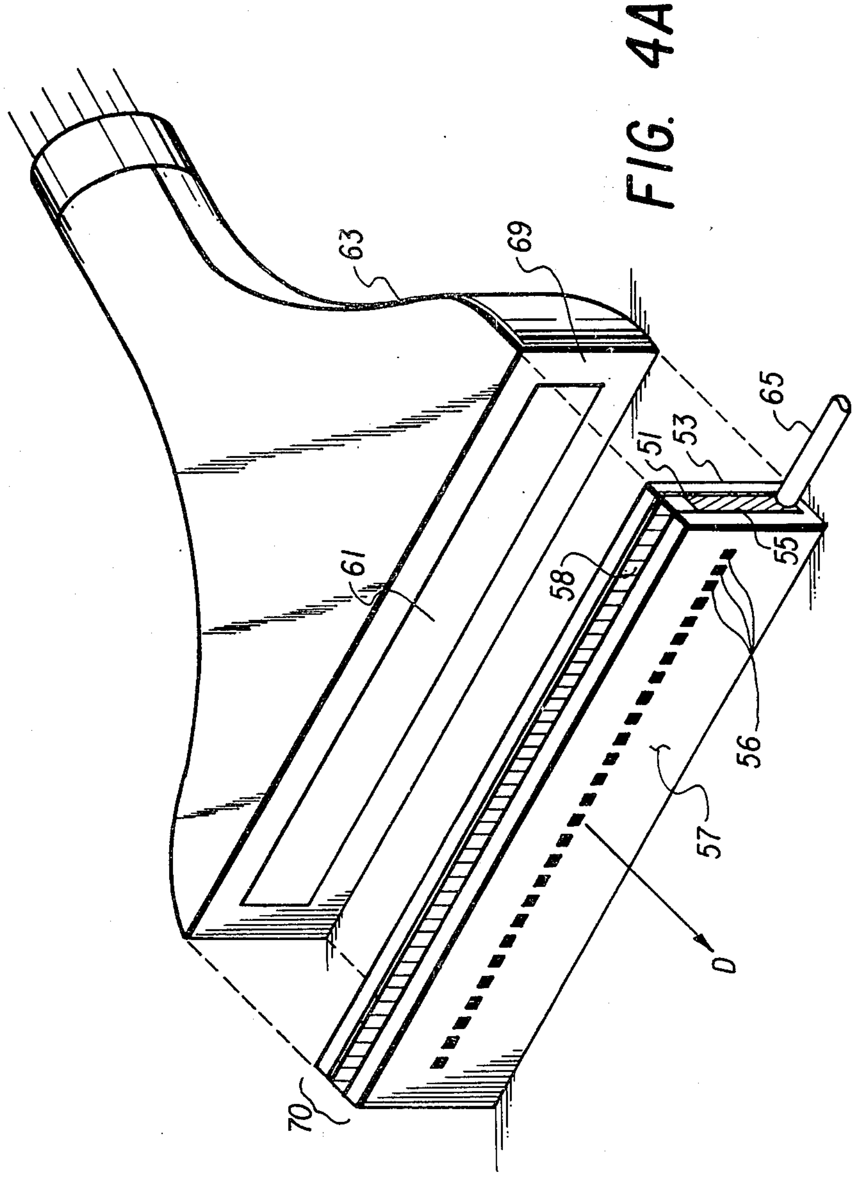
FIGS. 4A through 4C show an embodiment of the invention wherein the electrons from the electron beam are absorbed directly in the ink or in the electron window.
Figure 4B:
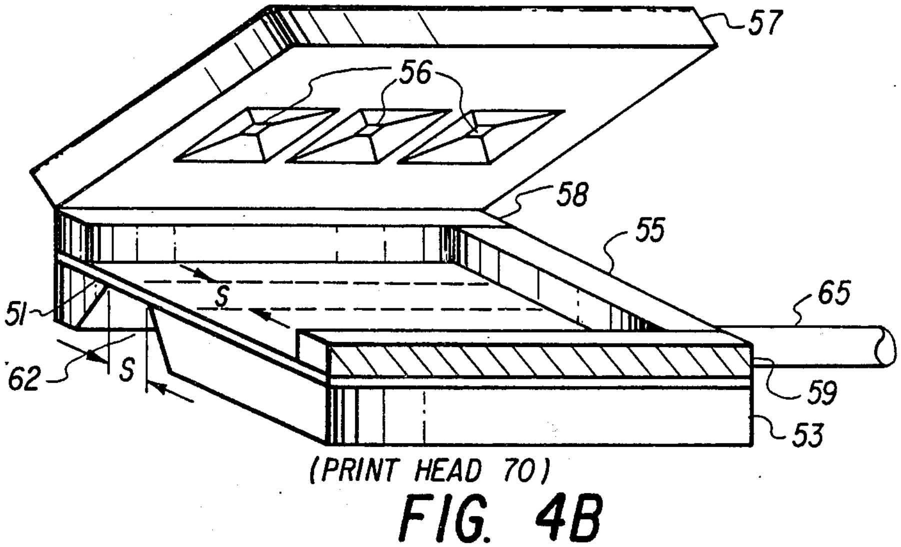
Figure 4C:
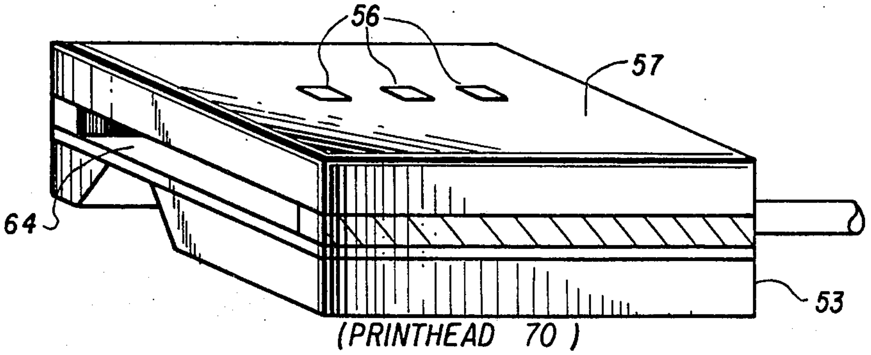

Another embodiment of a thermal ink jet device according to the invention is shown in FIGS. 4A, 4B, and 4C. In this embodiment, the electrons are absorbed directly in the ink, rather than in heater pads. This approach achieves a much higher energy efficiency in creating bubbles, since the energy is absorbed in the ink itself, rather than in a heater pad which not only has a heat capacity itself but is also in intimate contact with a large heat reservoir, i.e., the electron window. As illustrated by these figures, the basic structure includes CRT 63 and a print head 70 which is identical to print head 50 of the previous embodiment with the exception that heater pads 60 have been omitted. Even the various dimensions of the previous embodiment are suitable, including the thickness of thin film 51, which is typically in the range of 1 to 5 microns when using a 20 to 30kV beam. The basic principle is that for these low beam energies, the electrons are absorbed in the ink substantially at the surface of the window, since the penetration depth for 30kV electrons in a fluid such as water-based ink is only about 20 microns or less. With the enhanced energy efficiency, the energy requirement per ejected droplet can be substantially reduced, perhaps to as low as 0.5 microjoules/droplet. An alternative embodiment can also be depicted by FIGS. 4A, 4B, and 4C. In this alternative embodiment, the electrons are absorbed in the window itself. To achieve this result while using a 30kV beam, it is necessary to increase the thickness of film 51 to about 10 microns to substantially stop all the electrons before they reach the ink. This creates a hot spot in the window which vaporizes ink which is in close proximity. Other dimensions and materials remain as in the previous embodiment.

Shown in FIGS. 5A, 5B, 5C, and 5D is yet another embodiment according to the invention of an electron beam driven thermal ink jet printer. The general concept is similar to that described in FIGS. 3A, 3B, and 3C, except that the electron window is not formed by etching a channel in the substrate material but instead is formed by etching a plurality of holes, each hole terminating at an electron window located immediately opposite a heating pad. In this embodiment, the process typically begins by depositing a heat control layer 86 onto a substrate 85, the substrate again being made up of any of the substrate materials described in the previous embodiments and with substantially the same dimensional constraints. Typical materials for heat control layer 86 are well known in the art and include, among others, $SiO_2$ and $Al_2O_3$, with typical thicknesses in the range of 1 to 10 microns, but generally varying depending on the particular material used and desired bubble collapse characteristics. (It should be noted that the heat control layer is not meant to be restricted to this particular window arrangement, but can be used as well with other window geometries, e.g., the slot geometry above.) Following deposition of control layer 86, a thin film 87 of electron window material is deposited thereon. Typical window materials and thicknesses are as described in previous embodiments. Following deposition of thin film 87, a plurality of holes such as 81, 82, and 83 are etched through substrate 85 and heat control layer 86, leaving electon windows such as 91, 92, and 93, respectively, each window typically in the range of 1 to 2 microns in diameter. Any number of etching techniques can be used depending on the particular combination of materials and hole geometry desired, for example, wet chemical or dry systems such as plasma etching might be used for isotropic etching. Even biased plasma etching, although slow, might be used for anisotropic etching for accurate control of hole size and configuration.

Figure 5A:
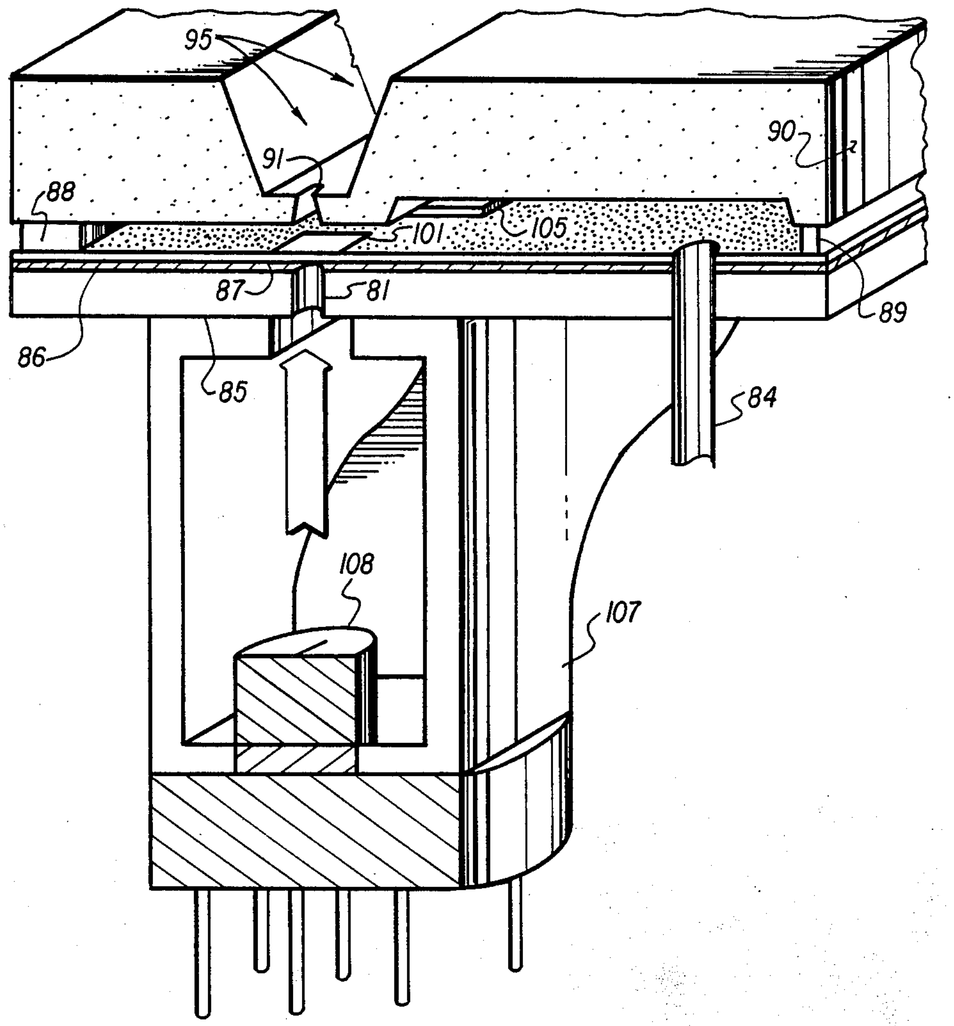
FIGS. 5A through 5D show another embodiment of a thermal ink jet print head according to the invention.
Figure 5C:
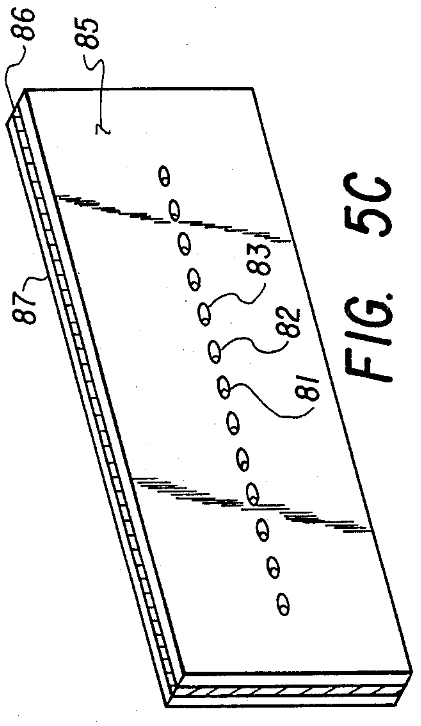
Figure 5D:
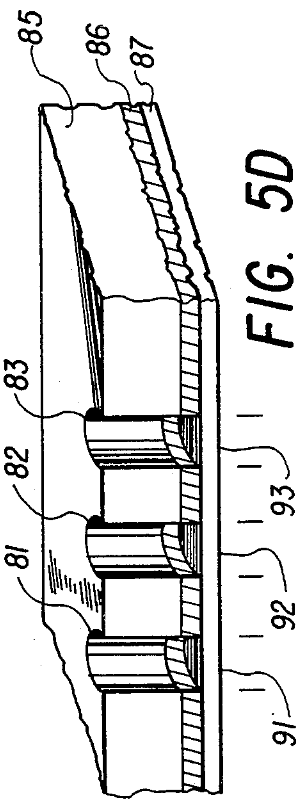
Figure 5B:
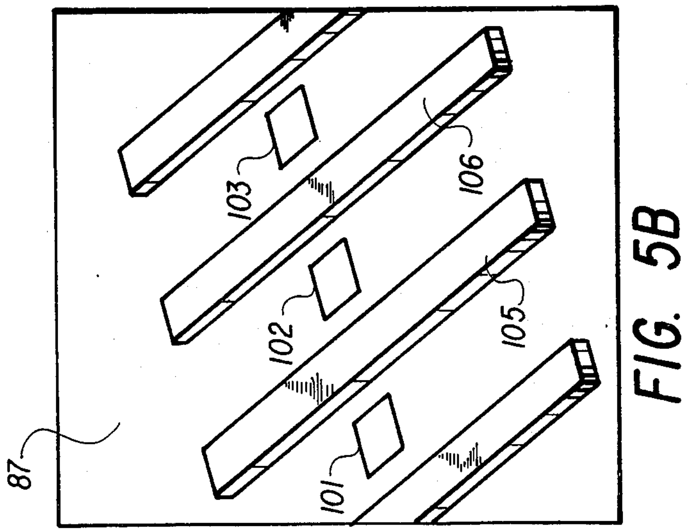

Following construction of the electron window/substrate combination, the balance of the thermal ink jet portion of the device is completed substantially as shown in FIGS. 5A and 5B. A plurality of heater pads represented by elements 101, 102, and 103 are deposited opposite electron windows 91, 92, and 93, respectively, each pad being constructed of the same materials and having the same dimensions as in previous embodiments. Spacers 88 and 89 are provided to separate thin film 87 from an orifice plate 90, thus forming a cavity for holding ink. Also provided is an ink fill tube 84 for permitting ink to enter the cavity. In this embodiment, orifice plate 90 has a plurality of orifices, as represented by orifice 96, which are recessed in a trough so that the orifice plate can be quite thick over a large region. This geometry provides good structural stability for large print heads, while at the same time permits an optimum thickness for the orifice plate at the orifices in order to promote good droplet definition. Typically, the thickness of the orifice plate measured from inside the reservoir to the outside edge of an orifice ranges from about 2 mils to about 5 mils. Orifice plate 95 can be constructed of a wide variety of materials, including but not limited to glass, silicon, polysilicon, plastic, and various metals.

Shown in FIG. 4B is a view of a portion of thin film 87 illustrating the relationship of heater pads 101, 102, and 103. Each of these heater pads lies along trough 95 immediately opposite an orifice. In order to prevent ink from being ejected from one orifice when an adjacent heater pad is heated, a barrier such as 105 and 106 is provided between successive heater pads to keep pressure waves generated by one heater pad from affecting the ejection of ink from orifices that correspond to other heater pads. Such barriers are generally made up of silicon, photopolymer, glass bead-filled epoxy, or metals.

After completing construction of the thermal ink jet head and electron window assembly, the entire assembly can be attached to the face of a CRT 107 by the techniques previously described. Electrons for driving the print head are then provided by an electron gun assembly 108.

One skilled in the art should recognize that there are innumerable embodiments according to the invention depending on the particular geometries and materials desired. For example, an embodiment that may be particularly advantageous would be to construct a two-part system. One part would be a CRT with an electron window much as described in FIG. 2A. The second part would then be a completely separate thermal ink jet assembly having its own electron window structure which would be placed in juxtaposition with the CRT window. Electrons from the CRT could then pass through the CRT window and through the thermal ink jet window to a heater pad within the thermal ink jet. In this way one could use the electron beam to drive the thermal ink jet without requiring that the CRT and the ink jet head to be an integral unit. With the above system, should either the thermal ink jet or the CRT fail, the failing part could be easily replaced.

What is claimed is:

1. A method of making a vacuum window which is permeable to electrons generated by an electron beam in a CRT assembly comprising the steps of:

selecting a first material as a substrate;

depositing onto said substrate by chemical vapor deposition a film of a second material which is permeable to electrons at the electron beam energic of interest, said film having an internal stress of less than $2\times10^9$ dynes/cm$^2$;

removing a portion of said substrate to leave a continuous window of said film;

attaching said substrate to the faceplate of said CRT assembly, said faceplate having a hole therein which is aligned with said continuous window; and evacuating said CRT assembly to provide a pressure differential of substantially one atmosphere or higher across said continuous window.

2. A method as in claim 1 wherein said portion of said substrate which is etched away has a length which is much greater than its width.

3. A method as in claim 1 wherein said second material is selected from the group consisting of SiC, BN, $B_4C$, $Si_3N_4$, and $Al_4C_3$.

4. A method as in claim 3 wherein said material is SiC.

5. A method as in claim 3 wherein said film has a thickness between 0.5 microns and 5 microns.

6. A method as in claim 3 wherein said film has a thickness of greater than 1 micron.

7. A method of making a vacuum window which is permeable to electrons generated by an electron beam in a CRT assembly comprising the steps of:

selecting a first material as a substrate;

depositing onto said substrate by chemical vapor deposition a film of a second material which is permeable to electrons at the electron beam energy of interest;

attaching said substrate with said film thereon to the faceplate of said CRT assembly, said faceplate having a hole therein with said film located between said substrate and said faceplate and covering said hole;

removing said substrate leaving said film attached to said faceplate to provide an electron window over said hole;

evacuating said CRT assembly to provide a pressure differential of substantially one atmosphere or higher across said electron window.

8. A method as in claim 7 wherein said film is deposited with an internal stress of less than $2\times10^9$ dynes/cm$^2$.

* * * * *